(12) United States Patent
Sautter et al.

(10) Patent No.: US 9,126,539 B2
(45) Date of Patent: Sep. 8, 2015

(54) LOAD-CARRYING DEVICES FOR VEHICLE ROOFS

(71) Applicant: Yakima Products, Inc., Beaverton, OR (US)

(72) Inventors: Chris Sautter, Portland, OR (US); Jason A. Sagen, Portland, OR (US)

(73) Assignee: Yakima Products, Inc., Beaverton, OR (US)

( * ) Notice: Subject to any disclaimer, the term of this patent is extended or adjusted under 35 U.S.C. 154(b) by 104 days.

(21) Appl. No.: 13/874,294

(22) Filed: Apr. 30, 2013

(65) Prior Publication Data

US 2014/0144958 A1 May 29, 2014

Related U.S. Application Data

(60) Provisional application No. 61/640,574, filed on Apr. 30, 2012, provisional application No. 61/678,008, filed on Jul. 31, 2012.

(51) Int. Cl.
| | | |
|---|---|---|
| *B60R 9/045* | (2006.01) | |
| *B60P 3/10* | (2006.01) | |
| *B63B 35/79* | (2006.01) | |
| *B60R 9/048* | (2006.01) | |
| *B60R 9/08* | (2006.01) | |

(52) U.S. Cl.
CPC ............... *B60R 9/045* (2013.01); *B60P 3/1008* (2013.01); *B60R 9/048* (2013.01); *B60R 9/08* (2013.01); *B63B 35/7946* (2013.01)

(58) Field of Classification Search
USPC ......... 224/314, 282, 310, 315, 319, 321, 324, 224/550, 558, 568, 406
See application file for complete search history.

(56) References Cited

U.S. PATENT DOCUMENTS

| | | | |
|---|---|---|---|
| 486,981 | A | 11/1892 | Gruenhagen |
| 1,500,924 | A | 7/1924 | Chadwick et at. |
| 1,807,104 | A | 5/1931 | Schat |
| 2,674,141 | A | 4/1954 | Cowan |
| 2,840,288 | A | 6/1958 | Broddon |
| 3,455,472 | A | 7/1969 | Rankin, Jr. |
| 3,750,812 | A | 8/1973 | Evans |
| 3,826,390 | A | 7/1974 | Watson |

(Continued)

FOREIGN PATENT DOCUMENTS

| | | |
|---|---|---|
| DE | 3543514 A1 | 6/1986 |
| DE | 10007078 A1 | 8/2001 |

(Continued)

OTHER PUBLICATIONS

U.S. Patent and Trademark Office, Office action regarding U.S. Appl. No. 13/874,364 dated Aug. 15, 2014, 13 pages.

(Continued)

*Primary Examiner* — Brian D Nash
(74) *Attorney, Agent, or Firm* — Kolisch Hartwell, P.C.

(57) ABSTRACT

A load-carrying device may be configured for use with a crossbar mounted to a vehicle roof. The load-carrying device may include a body having a load-bearing surface and an arm pivotably mounted to the body. The arm of the device may be pivotable between a collapsed position and an in-use position. A proximal end of the arm may be operatively connected to the body, and may move toward one end of the body when the arm is pivoted from the collapsed position to the in-use position.

18 Claims, 6 Drawing Sheets

(56) References Cited

U.S. PATENT DOCUMENTS

| | | | |
|---|---|---|---|
| 4,058,243 A | 11/1977 | Tappan | |
| 4,081,118 A | 3/1978 | Mason | |
| 4,333,575 A | 6/1982 | Wong | |
| 4,620,813 A | 11/1986 | Lacher | |
| 4,819,294 A | 4/1989 | Calvert | |
| 4,830,249 A | 5/1989 | Mirenda et al. | |
| 5,016,893 A | 5/1991 | Hart, Jr. | |
| 5,094,373 A | 3/1992 | Lovci | |
| 5,282,002 A | 1/1994 | Jacobs et al. | |
| 5,516,017 A | 5/1996 | Arvidsson | |
| 5,685,686 A | 11/1997 | Bums | |
| 5,690,259 A | 11/1997 | Montani | |
| 5,752,638 A | 5/1998 | Meeks | |
| 5,769,292 A | 6/1998 | Cucheran et al. | |
| 5,775,557 A | 7/1998 | Arvidsson | |
| 5,820,002 A | 10/1998 | Allen | |
| 5,951,231 A | 9/1999 | Allen | |
| 5,996,870 A | 12/1999 | Shaver | |
| D422,553 S | 4/2000 | VonDuyke | |
| 6,164,507 A | 12/2000 | Dean et al. | |
| 6,279,801 B1 | 8/2001 | Harrison | |
| 6,283,310 B1 | 9/2001 | Dean et al. | |
| 6,286,738 B1 | 9/2001 | Robins et al. | |
| 6,315,181 B1 | 11/2001 | Bradley et al. | |
| 6,321,678 B1 | 11/2001 | Skulnick | |
| 6,367,673 B1 | 4/2002 | Smith et al. | |
| 6,390,309 B1 | 5/2002 | Tucker | |
| 6,422,441 B1 | 7/2002 | Settelmayer et al. | |
| 6,425,509 B1 | 7/2002 | Dean et al. | |
| 6,460,743 B2 | 10/2002 | Edgerly et al. | |
| 6,561,396 B2 | 5/2003 | Ketterhagen | |
| 6,561,398 B1 | 5/2003 | Cole et al. | |
| 6,614,507 B2 | 9/2003 | Young et al. | |
| 6,681,971 B2 | 1/2004 | Laverack et al. | |
| 6,683,199 B1 | 1/2004 | Chen et al. | |
| 6,868,998 B2 | 3/2005 | Dean | |
| 6,892,913 B1 | 5/2005 | Andersson | |
| 6,918,521 B2 | 7/2005 | Settelmayer et al. | |
| 7,036,698 B2 | 5/2006 | Allen | |
| 7,070,374 B2 | 7/2006 | Womack et al. | |
| 7,131,561 B2 | 11/2006 | Humes | |
| 7,270,241 B2 | 9/2007 | Nobili | |
| 7,357,283 B2 | 4/2008 | Settelmayer | |
| 7,434,714 B2 | 10/2008 | Huang | |
| 7,481,344 B2 | 1/2009 | Naslund et al. | |
| 7,780,050 B2 | 8/2010 | Tucker | |
| 7,810,686 B2 | 10/2010 | Ilgenfritz | |
| 7,815,083 B2 | 10/2010 | Clausen et al. | |
| 8,136,708 B2 | 3/2012 | Sautter et al. | |
| 8,245,893 B2 | 8/2012 | Sautter et al. | |
| 2002/0125282 A1 | 9/2002 | Laverack et al. | |
| 2005/0077335 A1 | 4/2005 | Bourne | |
| 2005/0205626 A1 | 9/2005 | Dean | |
| 2006/0086766 A1* | 4/2006 | Settelmayer | 224/323 |
| 2006/0237500 A1 | 10/2006 | Settelmayer | |
| 2006/0273122 A1 | 12/2006 | Bogoslofski et al. | |
| 2006/0273124 A1 | 12/2006 | Bogoslofski | |
| 2006/0289577 A1 | 12/2006 | Malone | |
| 2007/0119888 A1 | 5/2007 | Chuang | |
| 2007/0164065 A1 | 7/2007 | Davis | |
| 2007/0235489 A1 | 10/2007 | Jeli et al. | |
| 2008/0035689 A1 | 2/2008 | Murray et al. | |
| 2008/0190979 A1 | 8/2008 | Robins et al. | |
| 2008/0193265 A1 | 8/2008 | Sautter et al. | |
| 2009/0120981 A1 | 5/2009 | Sautter et al. | |
| 2009/0120982 A1 | 5/2009 | Sautter et al. | |
| 2009/0120983 A1 | 5/2009 | Magnusson | |
| 2009/0120984 A1* | 5/2009 | Sautter et al. | 224/497 |
| 2011/0132946 A1* | 6/2011 | Sautter et al. | 224/324 |
| 2012/0234881 A1 | 9/2012 | Sautter et al. | |
| 2013/0037585 A1 | 2/2013 | Hubbard et al. | |
| 2014/0124551 A1* | 5/2014 | Condon et al. | 224/324 |
| 2014/0144959 A1 | 5/2014 | Sautter et al. | |

FOREIGN PATENT DOCUMENTS

| | | |
|---|---|---|
| FR | 2574875 A1 | 6/1986 |
| FR | 2684621 A1 | 6/1993 |
| JP | 2002052985 A | 2/2002 |

OTHER PUBLICATIONS

U.S. Patent and Trademark Office, Office action regarding U.S. Appl. No. 12/217,773, Jun. 30, 2011, 19 pages.

U.S. Patent and Trademark Office, Office action regarding U.S. Appl. No. 13/424,259, May 1, 2013, 21 pages.

The International Bureau of WIPO, International Search Report and Written Opinion of the International Searching Authority regarding PCT Patent Application No. PCT/IB2013/003137, Aug. 8, 2014, 18 pages.

The International Bureau of WIPO, International Preliminary Report on Patentability regarding PCT Application No. PCT/IB2013/003137, mailed Nov. 13, 2014, 8 pages.

U.S. Patent and Trademark Office, Office action regarding U.S. Appl. No. 13/874,364, dated Jan. 6, 2015, 34 pages.

* cited by examiner

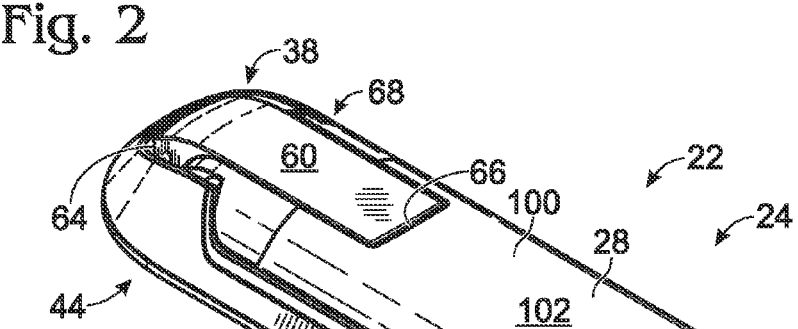
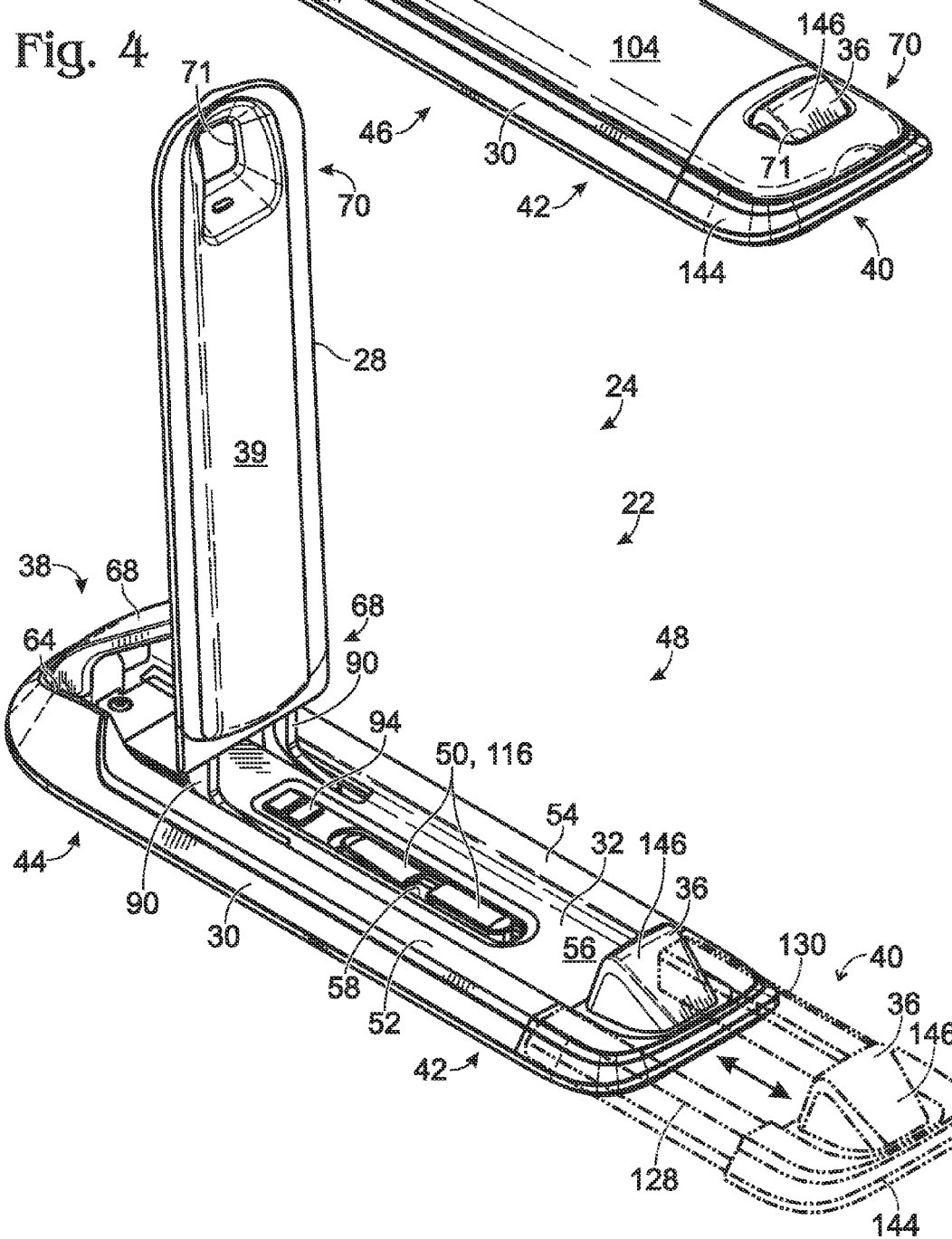

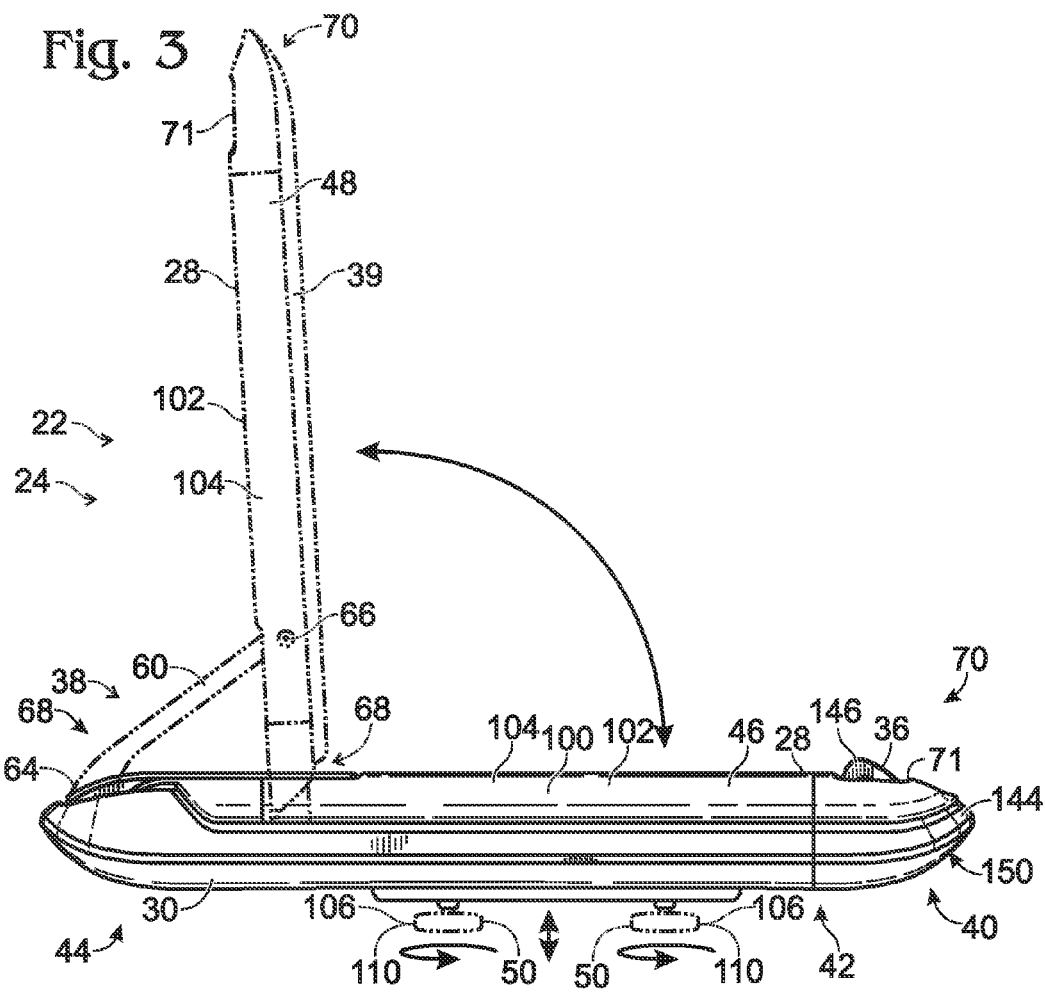
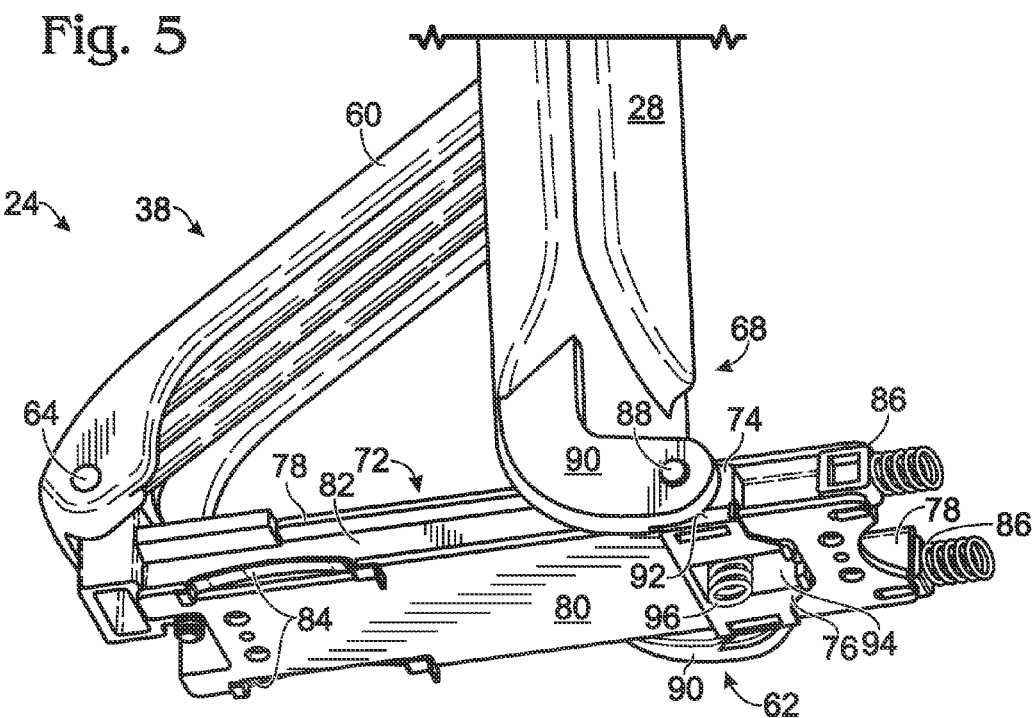

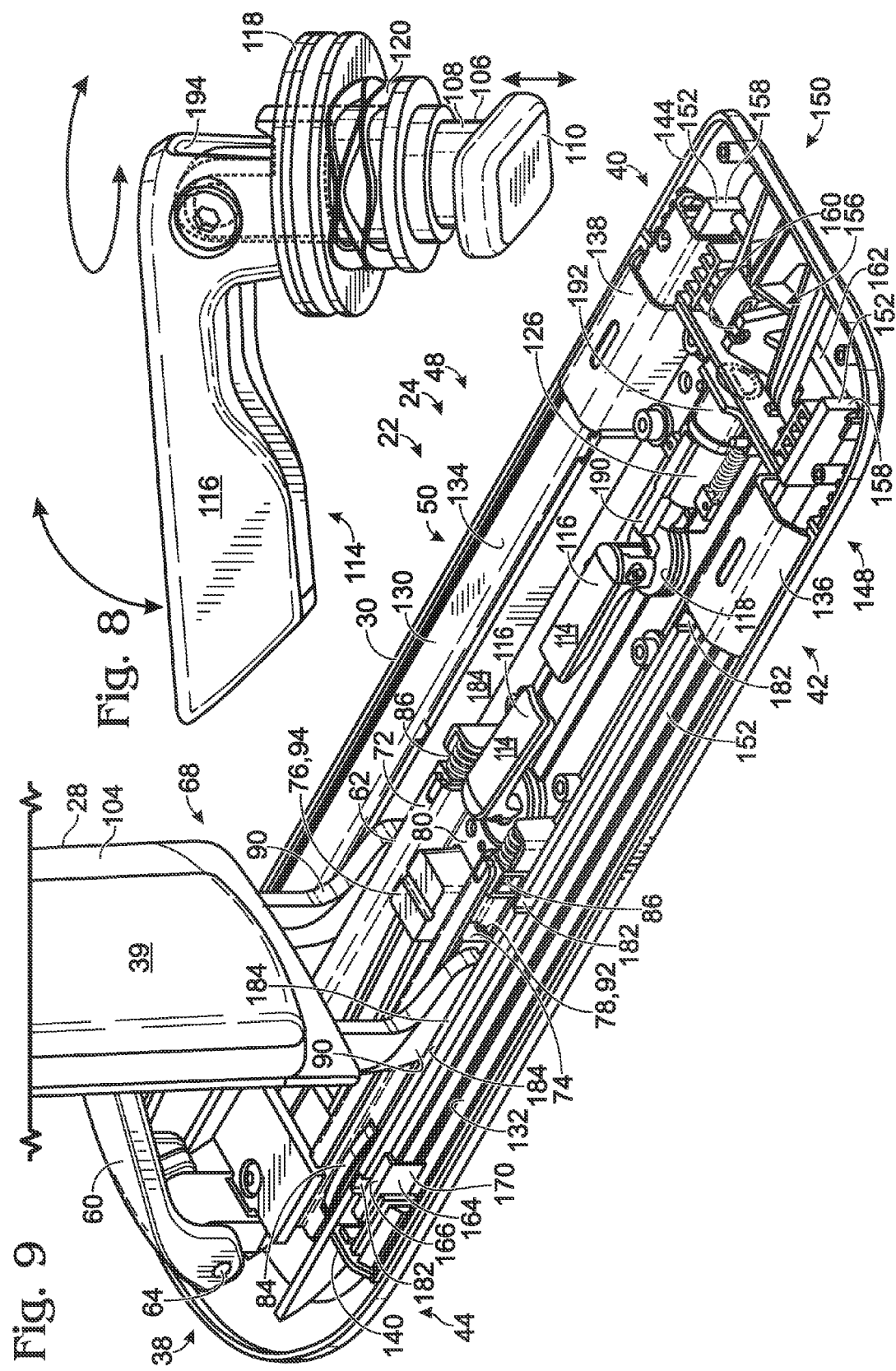

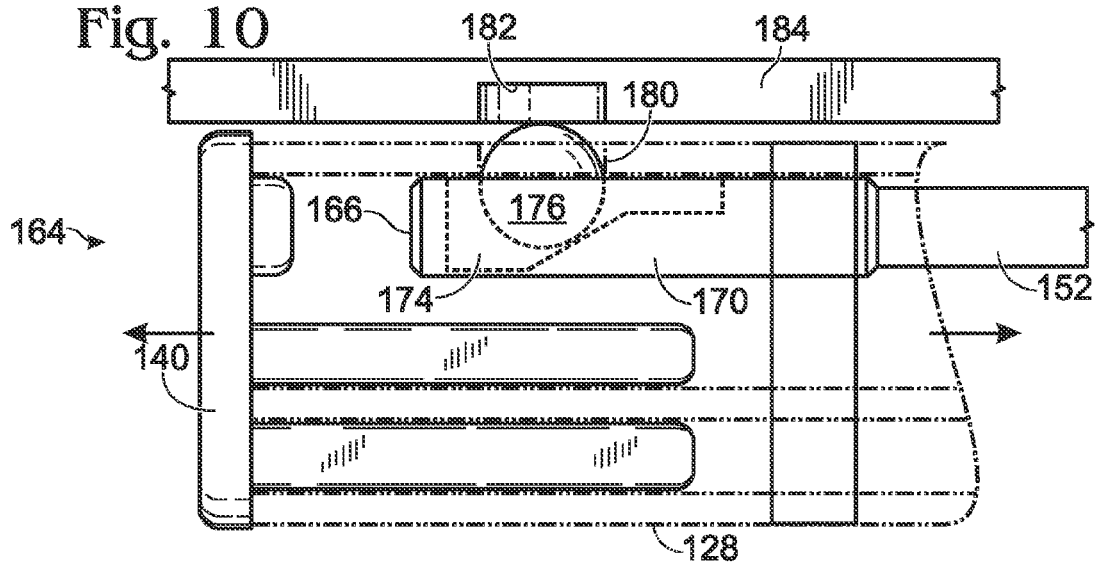
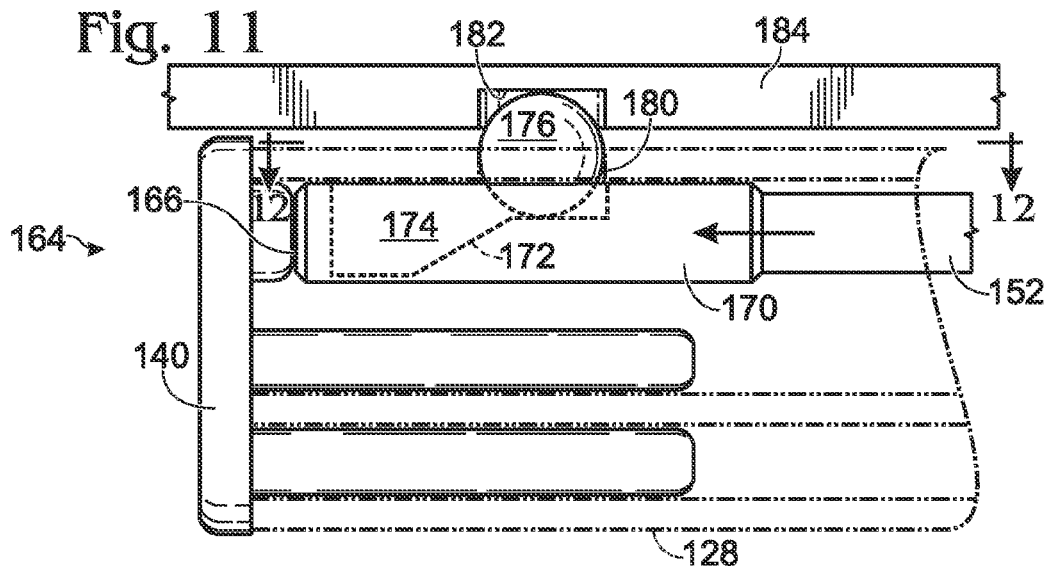
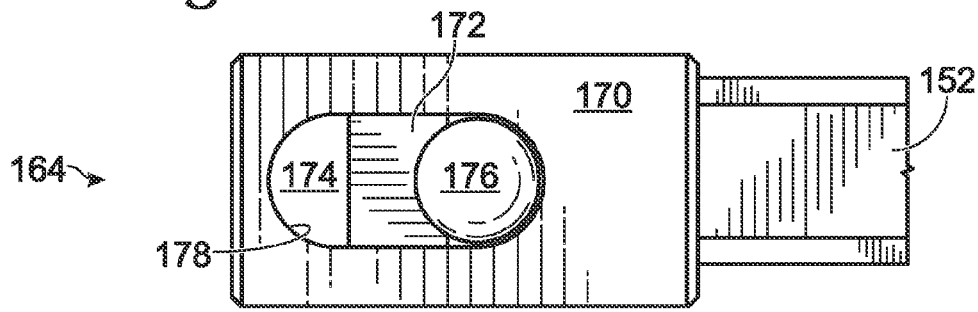

LOAD-CARRYING DEVICES FOR VEHICLE ROOFS

CROSS-REFERENCE TO RELATED APPLICATIONS

This application claims priority under 35 U.S.C. §119(e) to U.S. Provisional Patent Applications Ser. No. 61/640,574 filed Apr. 30, 2012 and Ser. No. 61/678,008 filed Jul. 31, 2012, all of which are incorporated herein by reference in their entireties for all purposes.

This application also incorporates by reference in their entireties the following U.S. patents and patent application: U.S. Pat. No. 7,036,698 issued May 2, 2006, U.S. Pat. No. 8,136,708 issued Mar. 20, 2012, U.S. Pat. No. 8,245,893 issued Aug. 12, 2012 and U.S. Publication No. US-2009-0120981-A1 published May 14, 2009.

FIELD OF THE INVENTION

The present disclosure relates to vehicle-mounted racks, and more particularly to load-carrying devices for use with a crossbar mounted to a vehicle roof.

INTRODUCTION

Vehicles are often fitted with racks for carrying cargo boxes, recreational equipment mounts, and various other types of load carriers. These vehicle racks may include crossbars, rails, or other elongate structural members extending over the roof of the vehicle or adjacent the rear of the vehicle. For example, typical roof rack systems may include a pair of crossbars mounted on top of a vehicle in an orientation perpendicular to the direction of vehicle travel.

Vehicle roof racks are often used for carrying boats such as canoes or kayaks. One type of vehicle roof rack for carrying boats is generically referred to as a J-cradle. J-cradle boat racks include a J-shaped mount that is often configured to hold a boat, such as a kayak, on an edge, typically at a slight inclination from the vertical. The slight inclination of the boat assists a user in steadying the boat while it is strapped to the rack. An example of a J-cradle boat rack is shown in U.S. Pat. App. Pub. 2006/0289577, the complete disclosure of which is incorporated by reference in its entirety for all purposes.

SUMMARY

In a first example, a load-carrying device for use with a vehicle rack may include an elongate body having a load-bearing surface facing generally upward, a first end portion, and a second end portion opposite the first end portion. An extendable member may be operatively attached to the first end portion of the body. An elongate arm may be pivotally attached to the second end portion of the elongate body, the arm being configured to pivot between a collapsed position adjacent to the body and an in-use position transverse to the load-bearing surface.

In a second example, a load-carrying device for use with a vehicle rack may include an elongate body having a load-bearing surface, a first end portion, and a second end portion opposite the first end portion. An elongate arm may have a distal end and a proximal end opposite the distal end, the proximal end attached to the second end portion of the body by a pivot assembly. The pivot assembly may include a prop member having a first pivotal connection to the second end portion of the body and a second pivotal connection to a location on the arm spaced from the proximal end. A slide assembly may be pivotally connected to the proximal end of the arm, the slide assembly being configured to constrain motion of the proximal end of the arm to a discrete linear path running along a length of the body. The arm may be configured to pivot between a collapsed position and an in-use position. The proximal end of the arm may move toward the first end portion of the body when the arm is pivoted from the collapsed position to the in-use position.

In a third example, a rack system for mounting on a vehicle having an elongate axis parallel to the direction of vehicular travel may include a crossbar and a pair of towers configured to mount the crossbar on top of a vehicle, the crossbar being substantially perpendicular to the elongate axis. A load-carrying device may be clamped to the crossbar, the load-carrying device including an elongate body having an upward-facing load-bearing surface and a first end portion and a second end portion opposite the first end portion, and an elongate arm having a distal end and a proximal end opposite the distal end, the proximal end attached to the second end portion of the body by a pivot assembly including a prop member having a first end pivotably connected to the second end portion of the body and a second end pivotably connected to a location on the arm spaced from the proximal end, and a slide assembly pivotably connected to the proximal end of the arm, the slide assembly being configured to constrain motion of the proximal end of the arm to a discrete linear path running along a length of the body. The arm may be configured to pivot between a collapsed position in which the arm is proximate the elongate body and the proximal end of the arm is adjacent to the second end portion of the body, and an in-use position in which the arm is erect relative to the load-bearing surface.

DRAWINGS

FIG. 2 is an isometric view of an illustrative load-carrying device in the form of a folding J-cradle boat mount, shown in a collapsed position.

FIG. 3 is a side elevation view of the boat mount of FIG. 2, showing the relative positions of the arm in the collapsed and in-use positions.

FIG. 4 is an isometric view of the boat mount of FIG. 2 shown with an arm in an upright in-use position and an extendable member in an extended position shown in dashed lines.

FIG. 5 is a bottom isometric view of a pivoting slide assembly for attaching the arm of the boat mount of FIG. 2 to the body of the boat mount.

FIG. 8 is an isometric view of a cam-handled clamp of the clamping mechanism of FIG. 7.

FIG. 9 is a top isometric view of a body of the boat mount of FIG. 2, with an upper casing and various components removed.

FIGS. 10 and 11 are plan views of a locking mechanism of the boat mount of FIG. 2, showing the locking mechanism in two different configurations.

FIG. 12 is a side elevation view of the locking mechanism of FIGS. 10 and 11 taken generally along line 12-12 in FIG. 11.

DESCRIPTION

The present disclosure describes a system and apparatus for securing a load to a vehicle-mounted rack. Vehicle racks may be mounted on any type of vehicle (e.g., car, van, truck, etc.), and many vehicle manufacturers include factory-installed racks on some vehicle models. While racks are often mounted on the roofs of vehicles, racks may also be mounted on other parts of a vehicle, such as the trunk or rear of the vehicle. Vehicle racks include bars, such as crossbars and rails, for securing and supporting loads.

Figure 1:
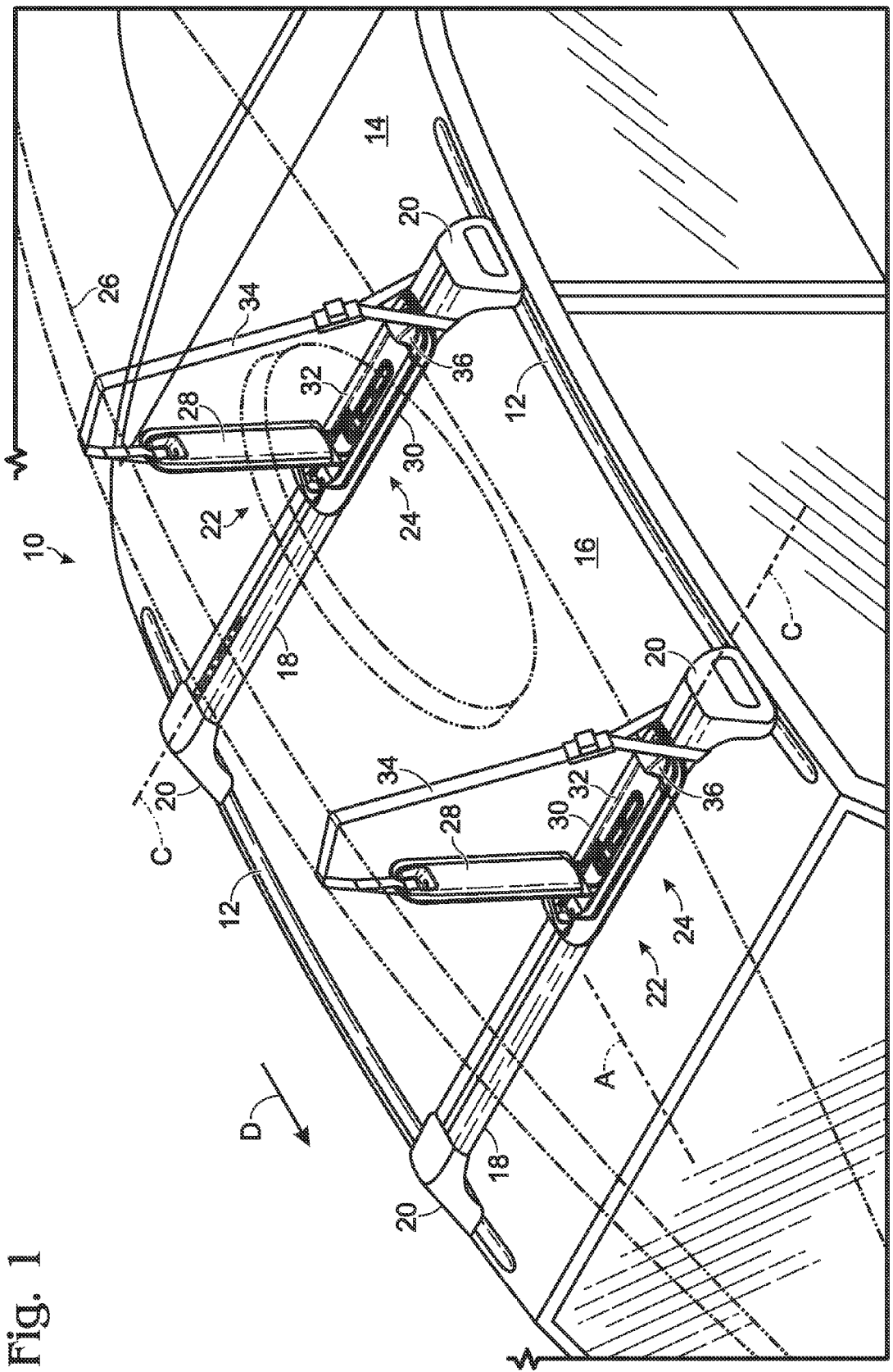
FIG. 1 is an isometric view of an illustrative vehicle roof rack for carrying boats, shown installed on a vehicle roof, with the roof rack including a pair of load-carrying devices in the form of folding J-cradle boat mounts.

An example of a vehicle roof rack is shown generally at 10 in FIG. 1. Unless otherwise specified, vehicle roof rack 10 and/or its various components may, but are not required to, contain at least one of the structure, components, functionality, and/or variations described, illustrated, and/or incorporated herein. As shown in FIG. 1, vehicle roof rack 10 may include a pair of rails 12 attached to a roof 14 of a vehicle 16. Vehicle 16 has an elongate axis A and generally travels in a direction of travel D. At least one crossbar 18 extends between rails 12. Crossbar 18 has a long axis C, and is substantially perpendicular to vehicle axis A. In the example shown in FIG. 1, rack 10 includes first and second crossbars 18. Crossbars 18 may be supported or mounted relative to roof 14 and/or rails 12 by any suitable structure, such as a pair of feet or towers 20. A load-carrying device 22, which is configured to at least partially support a load, is mounted to, secured to, and/or supported by at least one of the crossbars 18. In the example shown in FIG. 1, the rack includes first and second load-carrying devices 22 mounted or secured respectively to first and second crossbars 18.

As shown in FIG. 1, each load-carrying device 22 may be in the form of a folding J-cradle boat mount 24, which is suitable for securing or carrying a boat 26 such as a kayak. Although load-carrying device 22 in the examples presented herein is shown in the form of folding J-cradle boat mounts, it should be understood that load-carrying device 22 and/or its various components may be configured and/or used for the carriage of a wide range of articles. References to a "boat" should be understood to encompass any load or article that might be carried on, and/or supported by, the load-carrying device described.

As shown in FIGS. 1-4, boat mount 24 includes an elongate arm 28 pivotally connected to a generally horizontal elongate body 30. Arm 28 may be positioned transversely relative to body 30. By "transverse" or "transversely," it is meant that the indicated members are obliquely or perpendicularly oriented. For example, arm 28 may be inclined at a suitable angle, such as approximately 5, 10, 15 or even 20 or more degrees relative to a vertical plane, which may form an obtuse angle between the arm and the body. Body 30 may include a load-bearing surface 32, which may be at least partially upwardly oriented or facing. As shown in FIG. 1, when loaded onto the boat mount, a side edge of boat 26 rests, or is supported, on load bearing surface 32 and a major surface of the boat, such as the deck or lower hull, rests against or is supported by arm 28. Boat 26 may be secured to boat mount 24 with a flexible strap 34, which may be secured to a distal end of arm 28 and to a suitable lower point such as the crossbar 18, passing around the hull of boat 26. A protrusion 36 located at one end of body 30 may be configured to at least partially support boat 26, such as while a user is securing strap 34.

In some examples, some or all of the surfaces of boat mount 24 that contact the boat may be padded. The padding may be circumferentially continuous and/or the padding may extend along the arm in a continuous or uninterrupted manner. Padding that is continuous along the length of the upright arm may provide easier loading of the boat into the mount because the hull of the boat may be relatively continuously slid along the continuous padding. In some examples, load bearing surface 32 may be at least partially padded. Such padding on the surfaces of the boat mount may improve boat protection during loading and unloading as well as during use. Suitable padding materials may include a felt material or a resilient plastic foam material, such as ethylene-vinyl acetate ("EVA") foam or the like, either separately or in combination. In the examples shown, padding may be partly or completely enclosed within a plastic housing or shell.

Boat mount 24 and associated configurations thereof are shown in greater detail in FIGS. 2-5. Unless otherwise specified, the boat mount may, but is not required to, contain at least one of the structure, components, functionality, and/or variations described, illustrated, and/or incorporated herein. Furthermore, the structures, components, functionalities, and/or variations described, illustrated, and/or incorporated herein in connection with the folding J-cradle boat mount may, but are not required to, be included in other load-carrying members. In the example shown, boat mount 24 includes arm 28 operatively connected to body 30 at one end portion by a pivot assembly 38, and having an extendable member 40 at an opposite end portion.

With continuing reference to FIGS. 2-5, body 30 may be any suitable structure configured to be mountable to a crossbar and to support a load on a load-bearing surface while supporting the pivotal attachment for an arm that also has a load-bearing surface. In the example shown, body 30 forms an elongate base portion of the boat mount. Body 30 includes a first end portion 42 and a second end portion 44 opposite the first. Arm 28 is connected to second end of body 30 by pivot assembly 38 and has an upper surface opposite a lower surface including a substantially planar load bearing surface 39.

FIG. 2 shows an isometric top view of boat mount 24 in a first position referred to as a "stowed," "storage," or "collapsed" position (generally indicated at 46) in which the arm is folded down and is proximate, adjacent, and/or parallel to the load-bearing surface of the body. FIG. 3 shows a side elevation view of boat mount 24 in collapsed position 46, and also depicts how the arm pivots into a second position referred to as an "erect," "transverse," "raised," or "in-use" position (generally indicated at 48), in which the arm is raised to an erect and transverse position relative to the body, typically forming an obtuse angle. FIG. 4 shows an isometric view of in-use position 48, as well as depicting the sliding nature of a connection between extendable member 40 and body 30, further described below.

As shown in FIGS. 3 and 4, body 30 includes load-bearing surface 32 and clamping assembly 46. Load-bearing surface 32 is a generally planar or concave surface, and may be padded as discussed above. In the examples shown, load-bearing surface 32 includes raised portions 48 and 50, as well as a recess 52. Raised portions 48 and 50 run along respective longitudinal edges of body 30, and may facilitate proper load distribution on the surface, while resisting direct or excessive contact with a central portion including the recess. Additionally, raised portions 48 and 50 may accommodate and/or function as walls for internal compartments housing other components in the body as discussed below. Recess 52 may include one or more cut-outs or apertures in surface 32, and may be any suitable size and shape to accommodate access to actuators associated with body 30. For example, recess 52 includes an aperture 54 facilitating access to actuators for clamping assembly 46.

Arm 28 may be attached to second end portion 44 of body 30 by any suitable pivoting mechanism configured to allow arm 28 to be placed in at least the collapsed and in-use positions. In the example shown in FIGS. 3-5, pivot assembly 38 is a triple-pivot mechanism including a prop member 60 and a slide assembly 62. Prop member 60 is an elongate, generally rectangular, rigid member having a first pivotal connection 64 to second end portion 44 and a second pivotal connection 66 to a top side of arm 28 at a position spaced from a proximal end 68 of the arm. Arm 28 also includes a distal end 70 situated opposite proximal end 68 and having an aperture or hole 71 formed therethrough. Each of the pivotal connections (64 and 66) may include any suitable hinged or pivoting structure configured to pivot or rotate on an axis that is substantially perpendicular to the elongate axis of the body, and subsequently substantially perpendicular to axis C when mounted on crossbar 18. In the example shown, pivotal connections 64 and 66 are hinged connections having hinge pins engaged with hinge knuckles (not shown). Prop member 60 is configured to affect the pivoting motion of arm 28 by urging the proximal end of arm 28 toward first end portion 42 of body 30 as the arm pivots upward, and also functions as a support for arm 28 when arm 28 is in in-use position 48.

With specific reference to FIG. 5, slide assembly 62 may be any suitable assembly configured to allow pivoting of arm 28 while constraining the proximal end of arm 28 to a discrete linear path running along a length of body 30. In other words, the proximal end of arm 28 is free to move along a length of body 30, but is also pivotably connected to the body. In the example best shown in FIG. 5, slide assembly 62 includes a slide frame 72, two carriages 74, and a latching device 76.

Slide frame 72 includes two parallel guide portions 78 connected by a substantially planar support plate 80. Each guide portion includes a linear channel 82 having a biasing mechanism 84 at one end and a cushion block 86 at the other end. The guide portions are configured to allow motion of the proximal end of arm 28 while constraining that motion to a path defined by the linear channels. Accordingly, the carriages 74 are configured to provide a connection between the proximal end of arm 28 and channels 82 of slide frame 72. Each carriage 74 is a substantially rectangular block configured to slide within a respective channel 82 and also to provide a pivotable connection 88 with arm 28. In the example shown in the drawings, each connection 88 is formed with a respective curved extension 90 on either side of the proximal end of arm 28. Each biasing mechanism 84 includes a leaf spring protruding partially into channel 82. When carriage 74 slides to the end of the channel containing the leaf spring, which corresponds with a pivoting of arm 28 into collapsed position 46, the carriage is slowed and further movement is resisted by the biasing mechanism. At the other end of the channel, cushion block 86 includes a biased end-stop that arrests motion of the carriage if it reaches the end of the channel, such as when arm 28 is pivoted beyond in-use position 48.

Latching device 76 may be any suitable device configured to releasably latch arm 28 into a desired in-use position, and in the example shown is located along slide frame 72 near the cushion blocks. Latching device 76 includes a latch portion 92 on each side of the slide frame and a central pushbutton portion 94 having a biasing spring 96. Each latch portion 92 is configured to arrest motion of arm 28 by, for example, blocking arm extension 90 and/or carriage 74. In the example shown, latch portion 92 includes a blocking portion that extends up through a gap in channel 82 and blocks carriage 74 from further motion toward cushion block 86. The blocking portion may be ramped or otherwise shaped to engage with a complementary surface of carriage 74. In some examples, latch portions 92 include additional blocking portions that also prevent motion of carriage 74 away from cushion block 86. Central pushbutton portion 94 is rigidly attached to each latch portion 92 such that downward displacement of portion 94 causes the latch portions to move out of the way of the carriages, allowing unhindered movement in either direction along the channel. Portion 94 is biased by spring 96 such that the pushbutton is normally in an "up" position with the latch portions engaged in the channel. As shown in FIG. 4, pushbutton portion 94 is accessible from load-bearing surface 32 of body 30 to allow a user to interact with the latching device.

Figure 6:
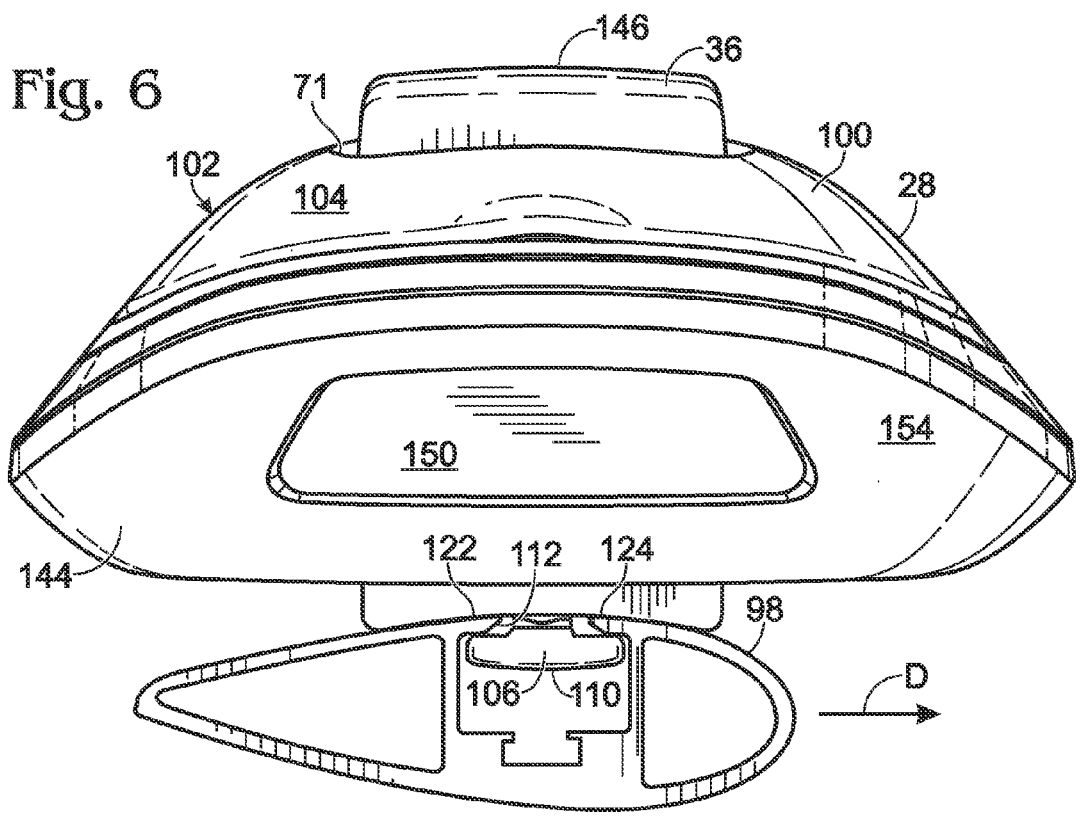
FIG. 6 is a side elevation view of the boat mount of FIG. 2, shown with the arm in a collapsed position and attached to an illustrative crossbar shown in a sectional view.

FIG. 6 shows an end elevation view of boat mount 24 secured to a slotted crossbar 98 and having arm 28 in collapsed position 46. As shown in the drawing, arm 28 forms an upper cover 100 of the boat mount. Arm 28 includes an upper surface 102 that has an external housing 104 with a smooth, downwardly curved profile. This profile reduces wind resistance and noise when in the collapsed position, as compared with other boat cradles known in the art. Along with the complementary shapes of body 30 and extendable member 40, arm 28 forms an aesthetically pleasing, sleek device suitable for use on any crossbar, especially on similarly designed aerodynamic crossbars.

Figure 7:
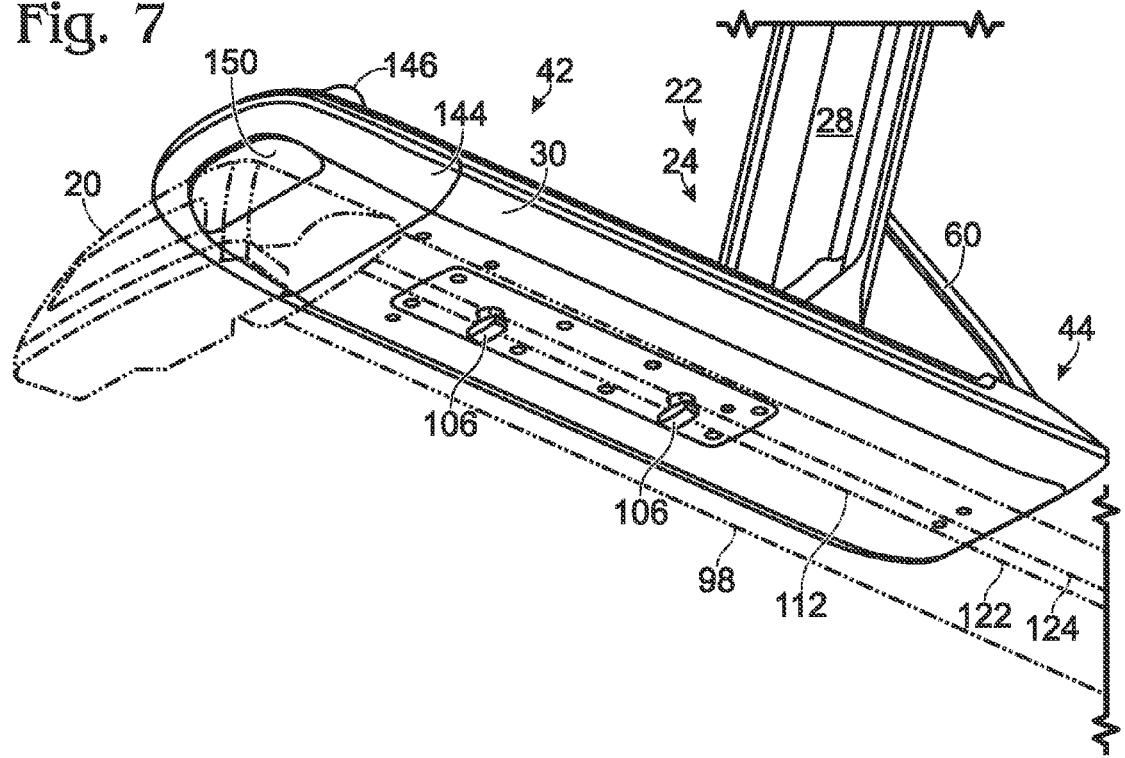
FIG. 7 is a bottom isometric view of the boat mount of FIG. 2 showing an illustrative clamping mechanism interfacing with a slotted crossbar shown in dashed lines, and shown with the arm in an upright in-use position.

Portions of clamping assembly 46 are also shown in FIG. 6 with further detail in FIGS. 7-9. Clamping assembly 46 may be any suitable assembly configured to attach or secure boat mount 24 to a crossbar. Crossbars may include various configurations and cross-sections, such as round bars, square bars, wing-shaped bars, and/or oval bars, any or all of which may include a longitudinal slot. Accordingly, various clamping solutions may be utilized, and any suitable clamping assembly may be included in the boat mount. In some examples, a separate docking device may be attached to the body of the boat mount and clamped to the crossbar. For example, suitable cleated clamping assemblies that may be used as a separate docking device or integrated into boat mount 24 are described in U.S. patent application Ser. Nos. 13/873,006 and 13/512,267, which are hereby incorporated by reference in its entirety for all purposes. In the example shown in the drawings, clamping assembly 46 is an integrated, cleated clamping assembly configured to attach the boat mount to a slotted crossbar.

As shown in FIGS. 6-8, clamping assembly 46 includes a shaped cleat 106 having a stem portion 108 terminating in an enlarged head portion 110. Clamping assembly 46 is configured such that head portion 110 of cleat 106 is insertable into a slot 112 in crossbar 98. Clamping of the boat mount body to the crossbar is accomplished by pinching a portion of crossbar 98 between head 110 and body 30. In the example shown, and as best seen in FIG. 8, clamping assembly 46 includes a pair of clamps 114 that each include a respective cleat 106, an actuator in the form of a cam handle 116, a cam interface in the form of flat washer or washers 118, and a biasing mechanism in the form of a spring washer assembly 120 such as a stack of one or more Belleville washers or one or more wave spring washers. Each clamp 114 is disposed in body 108 with cam handle 116 accessible from load-bearing surface 32 and with stem 108 passing through an aperture in the body such that head portion 110 depends from a lower surface of body 108 in a position that facilitates interfacing with the crossbar.

To operate each clamp 114, cam handle 116 may be pivoted upward to release the downward force on the flat washers from the cam handle and move stem 108 axially downward.

Cleat 106 is thereby moved away from body 30. Cam handle 114 may then be rotated to rotate cleat 106 and to align the shaped head portion 110 to allow it to pass unimpeded into slot 112. In the example shown, cleat 106 is in the form of an inverted "T," allowing the cleat to be rotated 90 degrees to put it either into or out of alignment with the slot opening. Once the cleat head is inserted into the slot, cam handle 114 is rotated 90 degrees or one quarter-turn to place the head portion transverse to the slot opening. Cam handle 114 may then be pivoted down to place cam force on flat washers 118 and draw head portion 110 of cleat 106 up under opposing lips 122 and 124 of slot 112, clamping the body to the slot in the crossbar.

FIG. 9 is an isometric overhead cut-away view of a lower portion of boat mount 24 with the upper shell of load-bearing surface 32 removed. As already described, arm 28 is operatively connected to second end portion 44 of body 30 by pivot assembly 38. The relative positions of cam handles 116 are also shown, accessible from the load-bearing surface. Extendable member 40 is operatively connected to first end portion 42 of body 30, and clamp locking assembly 126 is disposed between extendable member 40 and the cam handles.

Extendable member 40 may include any suitable structure configured to be selectively extendable and retractable from the first end of body 30 to provide a further, possibly temporary, support surface for a boat. In some examples, extendable member 40 may include a shaft in threaded engagement with the first end portion. In these examples, member 40 is extendable from the first end portion by rotating the shaft into and/or out of the body. In some examples, extendable member 40 may include a shaft that is pivotably attached at one end to the first end portion. In these examples, member 40 is extendable from the first end portion by pivoting the shaft into an extended position. In some examples, extendable member 40 may be in sliding engagement with the first end portion, for example as depicted in FIG. 4.

In the example shown, extendable member 40 includes parallel shafts 128 and 130, each having a proximal end configured to slidingly telescope into and out of first end portion 42. Referring now to FIG. 9, compartments 132 and 134 are respectively formed by the previously described raised portions 52 and 54 together with support structures 136 and 138 and end stops 140. Each shaft is configured to fit within and slide into and out of a respective compartment. The respective distal ends of the shafts are connected by a toe portion 144 having an upwardly protruding crest 146. Together, the shafts and toe portion form a horizontal U-shaped support. In addition to its function as a through-hole for attaching strap 34, hole 71 in distal end 70 of arm 28 is sized and shaped such that crest 146 fits into hole 71 when arm 28 is in collapsed position 46, as shown in FIG. 2 and other drawings.

With continuing reference to FIG. 9, and additional reference to FIGS. 10-12, extendable member 40 includes a locking mechanism, generally indicated at 148, configured to releasably secure the extendable member in one or more discrete states of extension. Locking mechanism 148 may include any structure configured to selectively fix the shafts of the extendable member in one or more positions. In some examples, locking mechanism 148 may include or be replaced by a detent mechanism that provides resistance to repositioning of the extendable mechanism when in certain positions. In the example shown, a locking mechanism is used, including an actuator 150 in the form of a pushbutton operatively connected to locking shafts 152 that fit into and are positionable within shafts 128 and 130. Each shaft includes lengthwise hollow spaces separated by internal walls, and a smaller locking shaft 152 extends down a length of one of the internal hollow spaces. For convenience, a single locking shaft 152 and associated components will at times be described. However, it should be understood that shaft 128 and 130 each includes substantially identical components and associated mechanisms.

Actuator 150 may be any suitable device or structure configured to provide a user interface for selectively operating the locking mechanism. In some examples, actuator 150 may include a pushbutton, a lever arm, a knob, a toggle, a slider, and/or a rotating wheel or nut. In the example shown, actuator 150 is a pushbutton-type actuator accessible from an end face 154 of toe portion 144 (also shown in FIG. 6). Actuator 150 is biased to be flush with end face 154 when not depressed, and is operatively connected to locking shafts 152 through transfer apparatus 156.

Transfer apparatus 156 may include any suitable structures configured to transfer motion of actuator 150 to the locking shafts. In the example shown, transfer apparatus 156 connects actuator 150 to a proximal end 158 of each locking shaft. Transfer apparatus 156 includes a pivot 160 and a cross-axle 162 configured to transfer the motion of the pushbutton to the proximal end of both locking shafts 152. In the example shown, the motion of the pushbutton is reversed by the transfer apparatus, meaning that when the actuator is pressed inward, the locking shafts are pulled out of the respective shafts. Locking shafts 152 move into and out of shafts 128 and 130 by a discrete amount as the actuator is repositioned.

A wedge lock 164 is included at a distal end 166 of each locking shaft 152. Wedge lock 164 includes a block 170 coaxial with and connected to locking shaft 152, a ramped wedge surface 172 in a recess 174 of the block, and a substantially spherical ball 176. Ball 176 is disposed in recess 174 and protrudes through both an elongate aperture 178 in the block and a smaller aperture 180 in an inner wall of the respective encompassing shaft (128 or 130). One or more gaps, slots, or holes 182 may be formed at spaced locations on a rail 184 running parallel to the shaft. In some examples, rail 184 includes a wall of respective compartment 132 or 134 containing the shaft.

Wedge lock 164 is configured to lock the shaft into predetermined positions corresponding to holes 182 by forcing ball 176 into one of the holes 182. As shown in FIG. 10, the locking shaft may be retracted, corresponding to actuator 150 being in a depressed position. In this "unlocked" position, the ramped wedge surface of block 170 is moved relative to the ball such that space for the ball is accommodated in recess 174. In this unlocked position, the ball is free of the adjacent hole 182, allowing the shaft to reposition. It is noted that the ball is essentially held in place by aperture 180 and block 170 is moved relative to the ball, creating more or less space for the ball depending on the position of the ramped wedge surfaced.

FIG. 11 shows a subsequent repositioning of the locking shaft and block 170, corresponding to actuator 150 being released to the biased or non-depressed position. In this "locked" position, the wedge surface has forced the ball outward from the shaft and into the adjacent hole 182, effectively preventing lateral motion of the shaft until actuator 150 is again depressed. If the actuator is released, but no adjacent hole 182 is available (such as when the extendable member is being extended or retracted between discrete positions), the ball will nonetheless be pressed toward rail 184 and will enter the next hole 182 it encounters. In other examples, as noted above, the wedge lock mechanism may be replaced or augmented by a detent mechanism. Such a detent mechanism may function substantially similarly to wedge lock 164, but with a biasing spring in place of the solid wedge, allowing the ball to provide surmountable resistance rather than forcible locking when it enters a hole.

Returning now to FIG. 9, clamp locking assembly 126 may include any suitable apparatus configured to selectively lock one or both clamps 114 in a clamped position. In the example shown, clamp locking assembly 126 includes a biased finger portion 190 operatively connected to a locking barrel 192. Finger portion 190 is oriented toward an opening 194 in the nearest clamp 114. Finger portion 190 is spring-biased into the retracted position shown. However, barrel 192 may be pushed toward clamp 114, overcoming the spring bias and inserting finger portion 190 into opening 194.

Locking barrel 192 may be key-operated, and may be capable of being locked with finger portion 190 in the inserted position. Inserting finger portion 190 into opening 194 prevents repositioning of the respective cam handle 116. Accordingly, locking the clamp locking assembly when the boat dock is mounted to a crossbar prevents one of the clamps from being removed from the crossbar. In the example shown, locking barrel 192 is not accessible or visible without pulling the toe portion of extendable member 40 away from body 30, providing additional security. In some examples, pushing toe portion 144 completely against the first end portion of body 30 may also push locking barrel 192 into a locked position, thereby automatically locking the clamp when the toe is not extended.

Based on the above description and the associated drawings, the following examples describe various embodiments of apparatuses and methods of the disclosure.

In a first example, a load-carrying device for use with a vehicle rack may include an elongate body having a load-bearing surface facing generally upward, a first end portion, a second end portion opposite the first end portion, and a clamp configured to attach the body to a crossbar of a vehicle rack. An extendable member may be operatively attached to the first end portion of the body. An elongate arm may be pivotally attached to the second end portion of the elongate body, the arm being configured to pivot between a collapsed position adjacent to the body and an in-use position transverse to the load-bearing surface.

The load bearing surface of the body may include a long axis, the extendable member being extendable in a direction parallel to the long axis of the load bearing surface.

The extendable member may be pivotally attached to the first end portion of the body. In some examples, the extendable member may include a shaft portion in threaded engagement with the elongate body. In some examples, the extendable member may include a shaft portion in sliding engagement with the elongate body.

The extendable member may include a U-shaped support having a first shaft and a second shaft, each shaft configured to slidingly telescope from the body of the load-carrying device, and a toe portion connecting the first shaft to the second shaft at respective distal ends of the shafts. A crest may project upward from the toe portion.

A crossbar may be configured to be mounted to a vehicle rack, and the elongate body of the device may be secured to the crossbar. The arm of the device may be configured to pivot about an axis that is substantially perpendicular to a long axis of the crossbar. The elongate body may include a clamp configured to secure the body to the crossbar. The clamp may include a shaped cleat having a head portion configured to pass into a longitudinal slot in the crossbar, the clamp being configured to secure the body to the crossbar by pulling the cleat head toward the body and pinching a portion of the crossbar between the cleat head and the body.

A locking mechanism may be configured to selectively lock the extendable member into at least one of a first position, a second position, and at least one position intermediate to the first and second positions, all positions being relative to the elongate body.

In a second example, a load-carrying device for use with a vehicle rack may include an elongate body having a load-bearing surface, a first end portion, and a second end portion opposite the first end portion. An elongate arm may have a distal end and a proximal end opposite the distal end, the proximal end attached to the second end portion of the body by a pivot assembly. The pivot assembly may include a prop member having a first pivotal connection to the second end portion of the body and a second pivotal connection to a location on the arm spaced from the proximal end. A slide assembly may be pivotally connected to the proximal end of the arm, the slide assembly being configured to constrain motion of the proximal end of the arm to a discrete linear path running along a length of the body. The arm may be configured to pivot between a collapsed position and an in-use position. The proximal end of the arm may move toward the first end portion of the body when the arm is pivoted from the collapsed position to the in-use position.

The collapsed position may include the arm being disposed proximate the elongate body and the proximal end of the arm being adjacent to the second end portion of the body. The in-use position may include the arm being in an erect orientation transverse to the load-bearing surface and the proximal end of the arm being disposed closer to the first end portion of the body than when in the collapsed position.

An extendable member may be operatively connected to the first end of the body. The extendable member may include a U-shaped support having a first leg and a second leg, each leg configured to telescope from the body of the load-carrying device, and a toe portion connecting the first leg to the second leg at respective distal ends of the legs. The toe portion of the extendable member may include a pushbutton operatively connected to a locking mechanism configured to releasably secure the extendable member in one or more discrete states of extension.

The toe portion of the extendable member may include an upward protrusion.

A latching device may be operatively connected to the body, the latching device configured to releasably latch the elongate arm in the in-use position.

The body may include a clamp configured to engage a crossbar mounted to the vehicle rack. The clamp may include a clamping assembly including a cam handle accessible from the load-bearing surface of the device, the cam handle operatively connected to a cleat having a stem portion terminating in an enlarged head portion, the cleat extending from a lower surface opposite the load-bearing surface and configured to clamp the device into a longitudinal slot in the crossbar.

A face of the arm may form an upper cover for the device when in the collapsed position, the upper cover including a substantially continuous, curved surface across a width of the arm.

An external housing may be included, the external housing having an opening formed through the arm, the opening disposed proximate the distal end of the arm. An extendable member may be configured to telescope from the first end of the body, the extendable member including a distal toe portion having formed thereon a crest. The crest may be configured to fit into the aperture in the arm when the arm is in the collapsed position.

The arm may have an upper surface facing generally away from the body when the arm is in the collapsed position, and a lower surface spaced from and opposite the upper surface, wherein the lower surface includes a substantially planar load-bearing portion. The load-bearing portion of the arm may form an obtuse angle with the load-bearing surface of the body when the arm is in the in-use position.

In a third example, a rack system for mounting on a vehicle having an elongate axis parallel to the direction of vehicular travel may include a crossbar and a pair of towers configured to mount the crossbar on top of a vehicle, the crossbar being substantially perpendicular to the elongate axis. A load-carrying device may be clamped to the crossbar, the load-carrying device including an elongate body having an upward-facing load-bearing surface and a first end portion and a second end portion opposite the first end portion, and an elongate arm having a distal end and a proximal end opposite the distal end, the proximal end attached to the second end portion of the body by a pivot assembly including a prop member having a first end pivotably connected to the second end portion of the body and a second end pivotably connected to a location on the arm spaced from the proximal end, and a slide assembly pivotably connected to the proximal end of the arm, the slide assembly being configured to constrain motion of the proximal end of the arm to a discrete linear path running along a length of the body. The arm may be configured to pivot between a collapsed position in which the arm is proximate the elongate body and the proximal end of the arm is adjacent to the second end portion of the body, and an in-use position in which the arm is erect relative to the load-bearing surface.

The proximal end of the arm may move toward the first end portion of the body when the arm is pivoted from the collapsed position to the in-use position.

An extendable member may be configured to slide telescopically into and out of the first end portion of the elongate body.

The arm may include an aperture formed through the arm proximate the distal end.

A clamp may be operatively attached to the body. The crossbar may include a longitudinal slot, and the clamp may be configured to secure the body to the crossbar by interfacing with the slot.

In a fourth example, a load-carrying device for use with a vehicle rack may include an elongate body having a load-bearing surface, a first end portion, and a second end portion opposite the first end portion. An elongate arm may have a distal end and a proximal end opposite the distal end, the proximal end attached to the second end portion of the body by a sliding pivot assembly configured to allow the proximal end of the arm to pivot relative to the body and to translate over a discrete linear path running along a length of the body. The arm may be configured to pivot between a collapsed position and an in-use position, and the proximal end of the arm moves along the discrete linear path toward the first end portion of the body when the arm is pivoted from the collapsed position to the in-use position.

In a fifth example, a load-carrying device for use with a vehicle rack may include an elongate body having a load-bearing surface, an elongate arm pivotably connected to one end portion of the elongate body, and a clamp operatively attached to the body, the clamp including a T-shaped cleat protruding from a mounting surface opposite the load-bearing surface, the cleat being configured to interface with a longitudinal slot in a crossbar and/or to secure the device to the longitudinal slot. The arm may be pivotable between a collapsed position in which the arm is adjacent the body and an in-use position in which the arm is raised to an erect position relative to the body.

In a sixth example, a load-carrying device for use with a vehicle rack may include an elongate body having a load-bearing surface and an underside. An elongate arm may be pivotably connected to one end portion of the elongate body, the arm being pivotable between a collapsed position in which the arm is adjacent the body and an in-use position in which the arm is raised to an erect position relative to the body. A clamp assembly may be operatively connected to the underside of the body, the clamp assembly including a cleat protruding from a mounting surface opposite the load-bearing surface, the cleat being T-shaped to secure the device to a longitudinal slot in a crossbar, the clamp having an actuator capable of rotating the cleat 90 degrees and translating the cleat upward toward the underside of the body.

The following paragraphs describe exemplary embodiments of the present disclosure:

A. A load-carrying device for use with a vehicle rack, the device comprising:
an elongate body having a load-bearing surface facing generally upward, a first end portion, a second end portion opposite the first end portion, and a clamp configured to attach the body to a crossbar of a vehicle rack;
an extendable member operatively attached to the first end portion of the body; and
an elongate arm pivotally attached to the second end portion of the elongate body, the arm being configured to pivot between a collapsed position adjacent to the body and an in-use position transverse to the load-bearing surface.

A1. The device of paragraph A, the load bearing surface of the body further including a long axis, the extendable member being extendable in a direction parallel to the long axis of the load bearing surface.

A2. The device of paragraph A, wherein the extendable member is pivotally attached to the first end portion of the body.

A3. The device of paragraph A, wherein the extendable member includes a shaft portion in threaded engagement with the elongate body.

A4. The device of paragraph A, wherein the extendable member includes a shaft portion in sliding engagement with the elongate body.

A5. The device of paragraph A4, wherein the extendable member comprises a U-shaped support having a first shaft and a second shaft, each shaft configured to slidingly telescope from the body of the load-carrying device, and a toe portion connecting the first shaft to the second shaft at respective distal ends of the shafts.

A6. The device of paragraph A5, further including a crest projecting upward from the toe portion.

A7. The device of paragraph A, further including a crossbar configured to be mounted to a vehicle rack, the elongate body of the device being secured to the crossbar by the clamp.

A8. The device of paragraph A7, the arm being configured to pivot about an axis that is substantially perpendicular to a long axis of the crossbar.

A9. The device of paragraph A8, wherein the clamp includes a shaped cleat having a head portion configured to pass into a longitudinal slot in the crossbar, the clamp being configured to secure the body to the crossbar by pulling the cleat head toward the body and pinching a portion of the crossbar between the cleat head and the body.

A10. The device of paragraph A, further comprising a locking mechanism, wherein the locking mechanism is configured to selectively lock the extendable member into at least one of a first position, a second position, and at least one position intermediate to the first and second positions, all of said positions being relative to the elongate body.

B. A load-carrying device for use with a vehicle rack, the device comprising:

an elongate body having a load-bearing surface, a first end portion, and a second end portion opposite the first end portion; and an elongate arm having a distal end and a proximal end opposite the distal end, the proximal end attached to the second end portion of the body by a pivot assembly, the pivot assembly including a prop member having a first pivotal connection to the second end portion of the body and a second pivotal connection to a location on the arm spaced from the proximal end, and a slide assembly pivotally connected to the proximal end of the arm, the slide assembly being configured to constrain motion of the proximal end of the arm to a discrete linear path running along a length of the body;

wherein the arm is configured to pivot between a collapsed position and an in-use position, and the proximal end of the arm moves toward the first end portion of the body when the arm is pivoted from the collapsed position to the in-use position.

B1. The device of paragraph B, wherein the collapsed position includes the arm being disposed proximate the elongate body and the proximal end of the arm being adjacent to the second end portion of the body, and the in-use position includes the arm being in an erect orientation transverse to the load-bearing surface and the proximal end of the arm being disposed closer to the first end portion of the body than when in the collapsed position.

B2. The device of paragraph B, further comprising an extendable member operatively connected to the first end of the body.

B3. The device of paragraph B2, the extendable member comprising a U-shaped support having a first leg and a second leg, each leg configured to telescope from the body of the load-carrying device, and a toe portion connecting the first leg to the second leg at respective distal ends of the legs.

B4. The device of paragraph B3, the toe portion of the extendable member further comprising a pushbutton operatively connected to a locking mechanism configured to releasably secure the extendable member in one or more discrete states of extension.

B5. The device of paragraph B3, the toe portion of the extendable member further comprising an upward protrusion.

B6. The device of paragraph B, further comprising a latching device operatively connected to the body, the latching device configured to releasably latch the elongate arm in the in-use position.

B7. The device of paragraph B, the body further comprising a clamp configured to engage a crossbar mounted to the vehicle rack.

B8. The device of paragraph B7, wherein the clamp comprises a clamping assembly including a cam handle accessible from the load-bearing surface of the device, the cam handle operatively connected to a cleat having a stem portion terminating in an enlarged head portion, the cleat extending from a lower surface opposite the load-bearing surface and configured to clamp the device into a longitudinal slot in the crossbar.

B9. The device of paragraph B, wherein a face of the arm forms an upper cover for the device when in the collapsed position, the upper cover including a substantially continuous, curved surface across a width of the arm.

B10. The device of paragraph B, the arm further including an external housing having an opening formed through the arm, the opening disposed proximate the distal end of the arm.

B11. The device of paragraph B10, further comprising an extendable member configured to telescope from the first end of the body, the extendable member including a distal toe portion having formed thereon a crest, wherein the crest is configured to fit into the aperture in the arm when the arm is in the collapsed position.

B12. The device of paragraph B, the arm having an upper surface facing generally away from the body when the arm is in the collapsed position, and a lower surface spaced from and opposite the upper surface, wherein the lower surface includes a substantially planar load-bearing portion.

B13. The device of paragraph B12, wherein the load-bearing portion of the arm forms an obtuse angle with the load-bearing surface of the body when the arm is in the in-use position.

C. A rack system for mounting on a vehicle having an elongate axis parallel to the direction of vehicular travel, the rack system comprising:

a crossbar and a pair of towers configured to mount the crossbar on top of a vehicle, the crossbar being substantially perpendicular to the elongate axis; and a load-carrying device clamped to the crossbar, the load-carrying device including an elongate body having an upward-facing load-bearing surface and a first end portion and a second end portion opposite the first end portion, and an elongate arm having a distal end and a proximal end opposite the distal end, the proximal end attached to the second end portion of the body by a pivot assembly including a prop member having a first end pivotably connected to the second end portion of the body and a second end pivotably connected to a location on the arm spaced from the proximal end, and a slide assembly pivotally connected to the proximal end of the arm, the slide assembly being configured to constrain motion of the proximal end of the arm to a discrete linear path running along a length of the body;

wherein the arm is configured to pivot between a collapsed position in which the arm is proximate the elongate body and the proximal end of the arm is adjacent to the second end portion of the body, and an in-use position in which the arm is erect relative to the load-bearing surface.

C1. The system of paragraph C, wherein the proximal end of the arm moves toward the first end portion of the body when the arm is pivoted from the collapsed position to the in-use position.

C2. The system of paragraph C, further including an extendable member configured to slide telescopically into and out of the first end portion of the elongate body.

C3. The system of paragraph C, wherein the arm includes an aperture formed through the arm proximate the distal end.

C4. The system of paragraph C, further including a clamp operatively attached to the body.

C5. The system of paragraph C4, wherein the crossbar includes a longitudinal slot, and the clamp is configured to secure the body to the crossbar by interfacing with the slot.

D. A load-carrying device for use with a vehicle rack, the device comprising:

an elongate body having a load-bearing surface, a first end portion, and a second end portion opposite the first end portion; and an elongate arm having a distal end and a proximal end opposite the distal end, the proximal end attached to the second end portion of the body by a sliding pivot assembly configured to allow the proximal end of the arm to pivot relative to the body and to translate over a discrete linear path running along a length of the body;

wherein the arm is configured to pivot between a collapsed position and an in-use position, and the proximal end of the arm moves along the discrete linear path toward the first end portion of the body when the arm is pivoted from the collapsed position to the in-use position.

E. A load-carrying device for use with a vehicle rack, the device comprising:

an elongate body having a load-bearing surface and an underside;

an elongate arm pivotably connected to one end portion of the elongate body, the arm being pivotable between a collapsed position in which the arm is adjacent the body and an in-use position in which the arm is raised to an erect position relative to the body; and a clamp assembly operatively connected to the underside of the body, the clamp assembly including a cleat protruding from a mounting surface opposite the load-bearing surface, the cleat being T-shaped to secure the device to a longitudinal slot in a crossbar, the clamp having an actuator capable of rotating the cleat 90 degrees and translating the cleat upward toward the underside of the body.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A load-carrying device for use with a vehicle rack, the device comprising:

an elongate body having a load-bearing surface, a first end portion, and a second end portion opposite the first end portion; and an elongate arm having a distal end and a proximal end opposite the distal end, the proximal end attached to the second end portion of the elongate body by a pivot assembly, the pivot assembly including a prop member having a first pivotal connection to the second end portion of the elongate body and a second pivotal connection to a location on the arm spaced from the proximal end, and a slide assembly pivotally connected to the proximal end of the arm, the slide assembly being configured to constrain motion of the proximal end of the arm to a discrete linear path running along a length of the elongate body;

wherein the arm is configured to pivot between a collapsed position and an in-use position, and the proximal end of the arm moves toward the first end portion of the elongate body when the arm is pivoted from the collapsed position to the in-use position.

2. The device of claim 1, wherein the collapsed position includes the arm being disposed proximate the elongate body and the proximal end of the arm being adjacent to the second end portion of the elongate body, and the in-use position includes the arm being in an erect orientation transverse to the load-bearing surface and the proximal end of the arm being disposed closer to the first end portion of the elongate body than when in the collapsed position.

3. The device of claim 1, further comprising an extendable member operatively connected to the first end of the elongate body.

4. The device of claim 3, the extendable member comprising a U-shaped support having a first leg and a second leg, each leg configured to telescope from the elongate body of the load-carrying device, and a toe portion connecting the first leg to the second leg at respective distal ends of the legs.

5. The device of claim 4, the toe portion of the extendable member further comprising a pushbutton operatively connected to a locking mechanism configured to releasably secure the extendable member in one or more discrete states of extension.

6. The device of claim 4, the toe portion of the extendable member further comprising an upward protrusion.

7. The device of claim 1, further comprising a latching device operatively connected to the elongate body, the latching device configured to releasably latch the elongate arm in the in-use position.

8. The device of claim 1, the elongate body further comprising a clamp configured to engage a crossbar mounted to the vehicle rack.

9. The device of claim 8, wherein the clamp comprises a clamping assembly including a cam handle accessible from the load-bearing surface of the device, the cam handle operatively connected to a cleat having a stem portion terminating in an enlarged head portion, the cleat extending from a lower surface opposite the load-bearing surface and configured to clamp the device into a longitudinal slot in the crossbar.

10. The device of claim 1, wherein a face of the arm forms an upper cover for the device when in the collapsed position, the upper cover including a substantially continuous, curved surface across a width of the arm.

11. The device of claim 1, the arm further including an external housing having an opening formed through the arm, the opening disposed proximate the distal end of the arm.

12. The device of claim 11, further comprising an extendable member configured to telescope from the first end of the elongate body, the extendable member including a distal toe portion having formed thereon a crest, wherein the crest is configured to fit into the aperture in the arm when the arm is in the collapsed position.

13. The device of claim 1, the arm having an upper surface facing generally away from the elongate body when the arm is in the collapsed position, and a lower surface spaced from and opposite the upper surface, wherein the lower surface includes a substantially planar load-bearing portion.

14. The device of claim 13, wherein the load-bearing portion of the arm forms an obtuse angle with the load-bearing surface of the elongate body when the arm is in the in-use position.

15. A load-carrying device for use with a vehicle rack, the device comprising:

an elongate body defining a long axis and having a load-bearing surface facing generally upward, a first end portion, a second end portion opposite the first end portion, and a clamp configured to attach the elongate body to a crossbar of a vehicle rack;

an extendable member operatively attached to the first end portion of the elongate body and extendable linearly from the elongate body in a direction parallel to the long axis of the elongate body; and an elongate arm pivotally attached to the second end portion of the elongate body, the arm being configured to pivot between a collapsed position adjacent to the elongate body and an in-use position transverse to the load-bearing surface.

16. The device of claim 15, wherein the extendable member includes a shaft portion in sliding engagement with the elongate body.

17. The device of claim 16, wherein the extendable member includes a toe portion connected to the shaft portion.

18. The device of claim 17, wherein the extendable member comprises a U-shaped support having a first shaft and a second shaft, each shaft configured to slidingly telescope from the elongate body of the load-carrying device, wherein the toe portion connects the first shaft to the second shaft at respective distal ends of the shafts.

* * * * *